Oct. 5, 1954  G. SCHULEIN  2,690,938
SPRING JOURNAL BOX PACKING
Filed Nov. 18, 1952
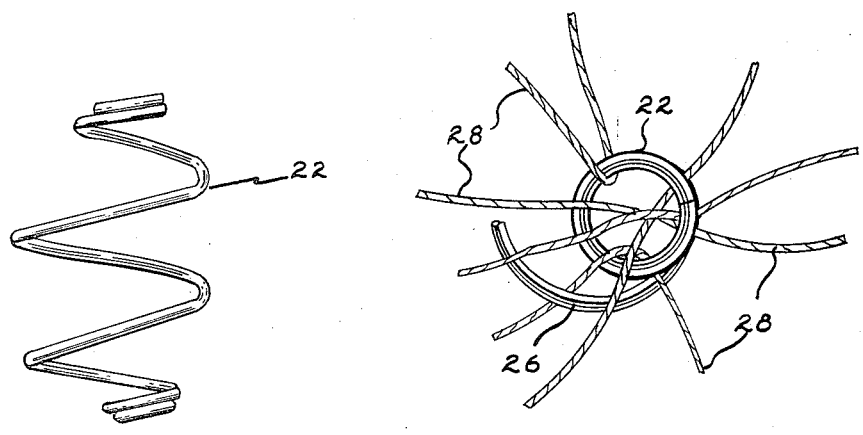
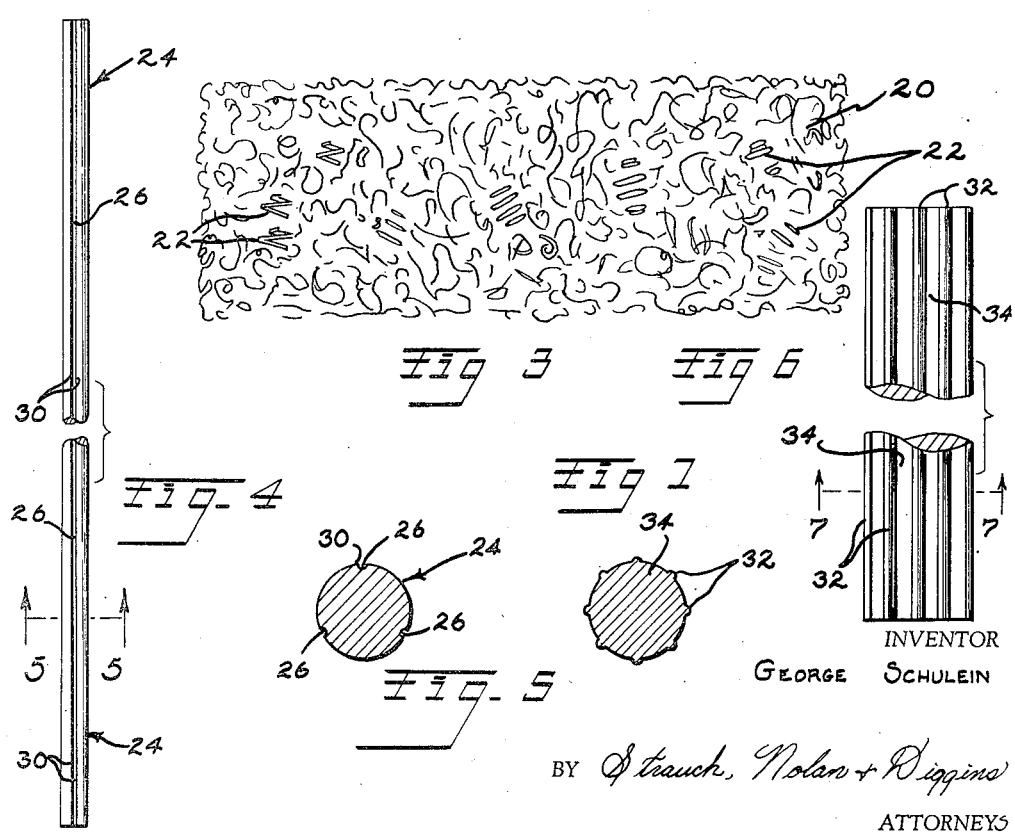
INVENTOR
GEORGE SCHULEIN
BY Strauch, Nolan + Diggins
ATTORNEYS Patented Oct. 5, 1954

2,690,938

UNITED STATES PATENT OFFICE 2,690,938

SPRING JOURNAL BOX PACKING

George Schulein, Chicago, Ill., assignor to National Waste Company, New York, N. Y., a corporation of Illinois Application November 18, 1952, Serial No. 321,172

9 Claims. (Cl. 308—243)

The present invention relates to spring packing composed of waste having a plurality of springs therein to maintain a resiliency in the waste material, and more particularly to novel means for dispersing a lubricant throughout the packing body and for preventing excessive compacting of the waste.

It is essential for the efficient and safe operation of journal boxes of railroad cars, as in many other packing box applications, that the packing material used to supply lubricant to the load carrying bearings of the rolling stock be sufficiently resilient or springy to maintain a continuous capillary action for delivering the lubricant throughout the journal box.

Wool packing material was, at one time, the accepted standard for journal boxes of railroad passenger cars and locomotives, since by its inherently resilient nature, the wool maintains a high degree of capillarity even when tightly sealed which makes the wool suitable as a lubricant dispersing element for journal box applications.

However, because of its relatively expensive nature and periodic shortage of supply, wool is not now universely used as a packing material for railroad journal boxes. New packing materials of a mixture of cotton waste and embedded metallic springs, such as that disclosed by United States Patent 2,449,333, have been found to approach the capillary characteristics of wool packings and have been substituted and widely used in place of wool.

This relatively new packing material, heretofore noted, is made by embedding a predetermined quantity of coil springs into a specified quantity or weight of the cotton waste. The several coils of the springs are anchored in the waste by the interspersing of the fibers of the waste, and this anchoring is further increased by winding the coils so that the springs have a generally spherical shape which permits engagement by the coils of widely divergent fibers in the packing body. The use of the springs in the cotton waste is necessary to maintain a desired resiliency and capillarity since, unlike wool, the tight packing of cotton waste in journal boxes materially lessens the capillary action of the waste and thus materially lessens the efficiency of the waste as a lubricant conductor. It has been found in practice that even with the springs in the waste there is local compacting, most often about the area of the embedded springs, and a loss of efficient lubrication. This is especially true after the waste has been in service for any length of time and has been serviced. It is customary when servicing installed packings to upset them or turn them over by means of a rod or poker and it often happens that during such servicing that the springs are bent or broken with the result that the waste is compacted and lies dormant in the area of the broken springs and loses its capillary action which may cause dry or hot spots, and eventually burned out bearings.

A further consideration is the proper anchoring of the springs in the waste body. Heretofore when a journal was to be repacked a selected quantity of packing was removed from a large bale. In the process of separating or selecting the desired quantity of packing the springs would often fall out, due to incomplete anchoring thus materially lessening the resiliency of the packing.

The present invention provides a novel, inexpensive means for obtaining a maximum degree of lubricating efficiency and materially extending the useful life of the packing, as well as providing improved means for properly and firmly anchoring the springs in the packing body.

It is therefore a major object of this invention to provide an improved spring packing.

A further object of this invention is to provide a spring packing in which the springs are provided with means to assure proper lubrication to the journal despite the bending or breaking of the spring in the packing.

An additional object of this invention is to provide a spring packing in which the springs are provided with lubricating channels to direct lubricant to the packing material.

Another object of this invention is to provide a spring packing material wherein the springs have added means to secure them in the packing material.

These and other objects and advantages will appear from the following description and appended claims when read in conjunction with the attached drawings wherein:

Figure 1 is an elevational view of the spring for use in the spring packing of this invention;

Figure 2 is a fragmentary plan view showing the spring gripping the strands or threads of the waste or packing material;

Figure 3 shows a mass of waste or packing material with the springs embedded therein;

Figure 4 is an elevational view of the spring wire before being wound into a spring showing a plurality of lubricating channels which in this embodiment are shown as grooves;

Figure 5 is a sectional view taken substantially along the line 5—5 of Figure 4 showing the preferred arrangement of equally spaced longitudinally extending lubricating channels;

Figure 6 is an enlarged elevational view of a modification of the spring wire wherein the lubricating channels are formed between a series of equally spaced longitudinally extending ridges; and Figure 7 is a sectional view along the line 7—7 of Figure 6 showing the raised surface ridges.

The spring packing of the present invention consists principally of a body of waste 20 which may be of cotton or other fibrous material. Springs 22 are distributed throughout the body of waste in a random fashion and are embedded therein to give a desired resiliency to the waste to improve the service life and capillarity of the waste.

A preferred form of the invention is illustrated by Figures 1, 2, 4 and 5 wherein springs 22 are formed from suitable spring wire generally indicated 24, preferably of brass. Wire 24 is generally formed by extrusion methods and is provided with three longitudinally extending lubricating channels, which in this embodiment take the form of grooves 26 approximately .005 inch deep spaced 120 degrees apart. It is to be understood that a greater or lesser number of lubricating channels may be employed without departing from the spirit of the invention. Wire 24 is spirally wound into a coil spring 22 in which the coils are relatively large and relatively widely spaced in the center and diminish both in radius and spacing toward each end so that the spring as a whole is of generally spheroidal shape. The spheroidal shape permits contact with widely divergent fibers in the packing body and when provided with lubricating channels 26 conduct lubricant to the divergent fibers, thus effecting a complete and novel lubrication of the packing.

As seen in Figure 2 the threads or fibers 28 become interspersed or entwined in the coils of spring to thereby firmly anchor the spring in the packing material. This anchoring is further enhanced by the presence of grooves 26 whose edges 30 also engage and catch the fibers to additionally secure the springs to the adjacent packing material.

As shown in the modification of Figures 6 and 7 the lubricating channels are formed by a plurality of longitudinally extending upstanding ridges 32, raised above the periphery of wire 34 approximately .005 inch. These ridges form channels therebetween in which a lubricant can freely flow. Like edges 30 of grooves 26 the exposed surface of ridges 32 also engage the fibers and aid in anchoring the springs in the packing material. These ridges may be of semicircular configuration, as shown, or may be provided with sharp edges, such as a rectangular section to engage the adjacent packing material.

The channels defined by grooves 26 or ridges 32 run the length of the springs 22 and 34 to form a conduit or guide through which a lubricant can flow along the length of the spring. These channels facilitates the distribution of lubricant throughout the fibrous packing material and prevent dry spots which could cause serious trouble. The value of the lubricating channel increases with the amount of service on the packing since extended service usually causes the packing body to become compressed or matted which lessens its capillarity thus preventing easy flow of the lubricant. This is particularly true when the packing has been upset by a poker and the springs damaged thus causing the packing to lose its resiliency and lie dormant. The channels still permit a free flow of lubricant along the length of the spring from where it is absorbed by the packing material adjacent the spring and distributed throughout the journal box.

Additionally lubricating groove edges 30 and the exposed surfaces of ridges 32 aid in firmly anchoring the springs in the packing body and lessen the chances of springs becoming loose and falling out of the body, and thereby assure a resilient and efficient packing.

From the foregoing it will be seen that the novel spring packing herein described has improved qualities of resiliency, improved means for maintaining the proper ratio of springs and waste, and improved means for assuring adequate and complete lubrication throughout the packing.

The invention may be embodied in other specific forms without departing from the spirit or essential characteristics thereof. The present embodiments are therefore to be considered in all respects as illustrative and not restrictive, the scope of the invention being indicated by the foregoing description and all changes which come within the meaning and range of equivalency of the claims are therefore intended to be embraced therein.

What is claimed and desired to be secured by United States Letters Patent is:

1. Spring packing comprising a fibrous body; a plurality of springs distributed throughout said body and embedded therein adapted to resiliently support said body; said springs being formed of a plurality of coils whereby the springs are embedded in said body and resiliently supporting said body; and means on each spring for directing a lubricant to said body adjacent said springs.

2. Spring packing comprising a fibrous body; a plurality of springs distributed throughout said body and embedded therein adapted to resiliently support said body; said springs being formed with a relatively few, relatively open spiral coils, the coils at each end of said springs being smaller than the coils in the center; and means on each spring for directing a lubricant to said body adjacent said springs.

3. The device as set forth in claim 1 wherein said means comprises at least one channel in each spring defining a path along which a lubricant can flow to said body adjacent each spring.

4. Spring packing comprising a fibrous body; a plurality of springs distributed throughout said body and embedded therein adapted to resiliently support said body; said springs being formed of a plurality of coils whereby the springs are embedded in said body and resiliently support said body; and a plurality of grooves in each of said springs defining channels through which a lubricant may flow to the body adjacent each spring.

5. Spring packing comprising a fibrous body; a plurality of springs distributed throughout said body and embedded therein adapted to resiliently support said body; said springs being formed of coiled wire whereby the springs are embedded in said body and resiliently support said body and a plurality of surface ridges on said wire extending the length of said springs defining lubricant channels whereby lubricant can flow along said channels and be absorbed by the body adjacent said springs.

6. Spring packing comprising a fibrous body; a plurality of spheroidal springs throughout said body and embedded therein adapted to resiliently support said body; said springs being formed of a plurality of coils whereby said coils engage said body and anchor said springs therein; and means on each spring exposed to said body adjacent each spring for guiding a lubricant along each spring to be absorbed by the adjacent body.

7. Spring packing comprising a body of waste through which a lubricant is dispersed by capillary action; a plurality of coil springs distributed throughout said body; and means forming a plurality of channels on the surface of each spring; said channels extending substantially along the length of each spring for guiding said lubricant along said spring whereby it is absorbed by said body adjacent each spring, and said channels gripping said body of waste to anchor said springs firmly therein.

8. The device as set forth in claim 7 wherein said means comprises a plurality of indented grooves on each of said springs.

9. The device as set forth in claim 7 wherein said means comprises a plurality of upstanding ridges on each of said springs defining a lubricant channel therebetween.

References Cited in the file of this patent

UNITED STATES PATENTS

| Number | Name | Date |
|--------|------|------|
| 2,499,333 | Schulein | Feb. 28, 1950 |